(12) United States Patent
Shwartzman

(10) Patent No.: US 9,057,537 B2
(45) Date of Patent: Jun. 16, 2015

(54) HEAT COLLECTION ELEMENT SUPPORT ELEMENT

(75) Inventor: Yoel Shwartzman, Shoham (IL)

(73) Assignee: SIEMENS CONCENTRATED SOLAR POWER LTD., Beit Shemesh (IL)

( * ) Notice: Subject to any disclaimer, the term of this patent is extended or adjusted under 35 U.S.C. 154(b) by 448 days.

(21) Appl. No.: 13/375,275

(22) PCT Filed: Jun. 8, 2010

(86) PCT No.: PCT/EP2010/057988
§ 371 (c)(1),
(2), (4) Date: Jan. 26, 2012

(87) PCT Pub. No.: WO2010/142666
PCT Pub. Date: Dec. 16, 2010

(65) Prior Publication Data
US 2012/0117968 A1    May 17, 2012

Related U.S. Application Data

(60) Provisional application No. 61/185,089, filed on Jun. 8, 2009.

(51) Int. Cl.
| *F24J 2/52* | (2006.01) |
|---|---|
| *F24J 2/14* | (2006.01) |
| *F24J 2/05* | (2006.01) |
| *F24J 2/07* | (2006.01) |
| *F24J 2/46* | (2006.01) |

(52) U.S. Cl.
CPC .. *F24J 2/14* (2013.01); *F24J 2/055* (2013.01); *F24J 2/07* (2013.01); *F24J 2/4636* (2013.01); *F24J 2/52* (2013.01); *Y02E 10/41* (2013.01); *Y02E 10/44* (2013.01); *Y02E 10/45* (2013.01); *Y02E 10/47* (2013.01); *Y02E 10/46* (2013.01)

(58) Field of Classification Search
USPC ......... 248/154, 80, 81, 82, 83, 84, 53, 49, 70, 248/74.1; 126/690, 694, 696
See application file for complete search history.

(56) References Cited

U.S. PATENT DOCUMENTS

| 1,649,649 | A | * | 11/1927 | Bank | 248/84 |
|---|---|---|---|---|---|
| 1,667,342 | A | * | 4/1928 | Blaw | 248/84 |
| 2,309,772 | A | * | 2/1943 | Karger | 248/82 |
| 3,809,348 | A | * | 5/1974 | Di Laura | 248/49 |
| 4,484,568 | A | | 11/1984 | Witt | |
| 4,515,148 | A | | 5/1985 | Boy-Marcotte | |
| 5,020,572 | A | * | 6/1991 | Hunt | 138/99 |
| 7,140,409 | B2 | * | 11/2006 | Leberfinger et al. | 144/286.1 |
| 2006/0091279 | A1 | * | 5/2006 | Jones | 248/431 |
| 2009/0127407 | A1 | * | 5/2009 | Pothanikat et al. | 248/74.1 |

FOREIGN PATENT DOCUMENTS

| AU | 568826 B2 | 1/1988 |
|---|---|---|
| CN | 201318827 Y | 9/2009 |
| DE | 102007048745 A1 | 4/2009 |
| WO | WO 2010043744 A2 | 4/2010 |

* cited by examiner

Primary Examiner — Alfred J Wujciak

(57) ABSTRACT

A support element configured for supporting a heat collection element (HCE) of a solar concentrator in a solar thermal power plant is provided. The support element comprises a post engaging portion being configured for being pivotally articulated to the top of an HCE support post, and an HCE engaging portion being configured for retaining therein the HCE.

4 Claims, 6 Drawing Sheets

FIG 1
A)
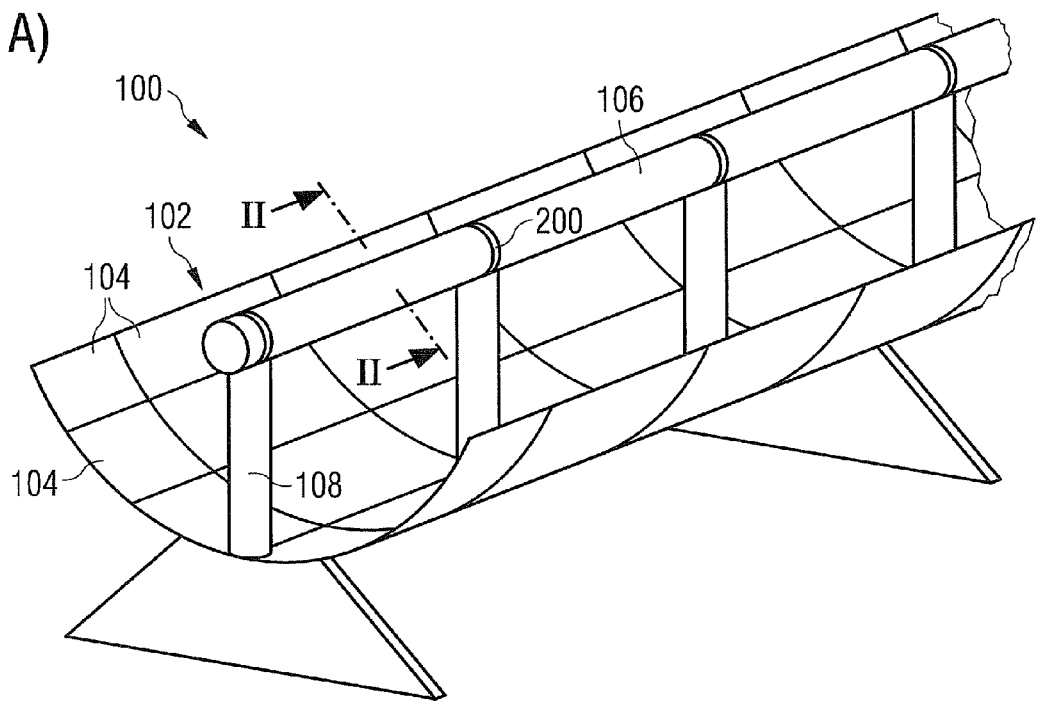
B)
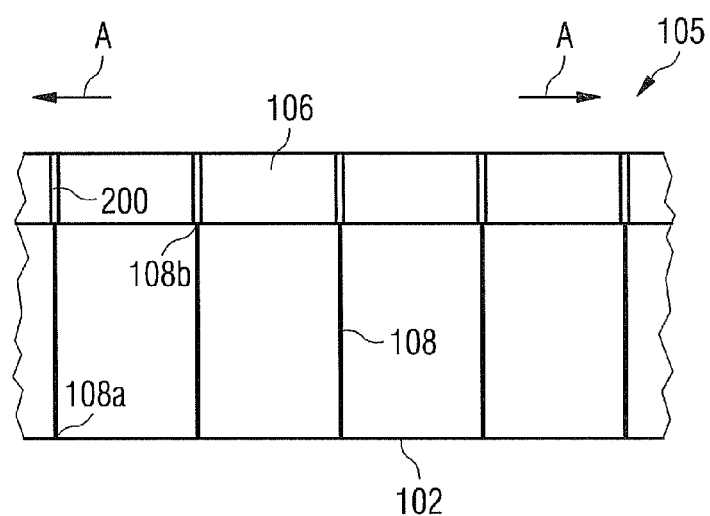

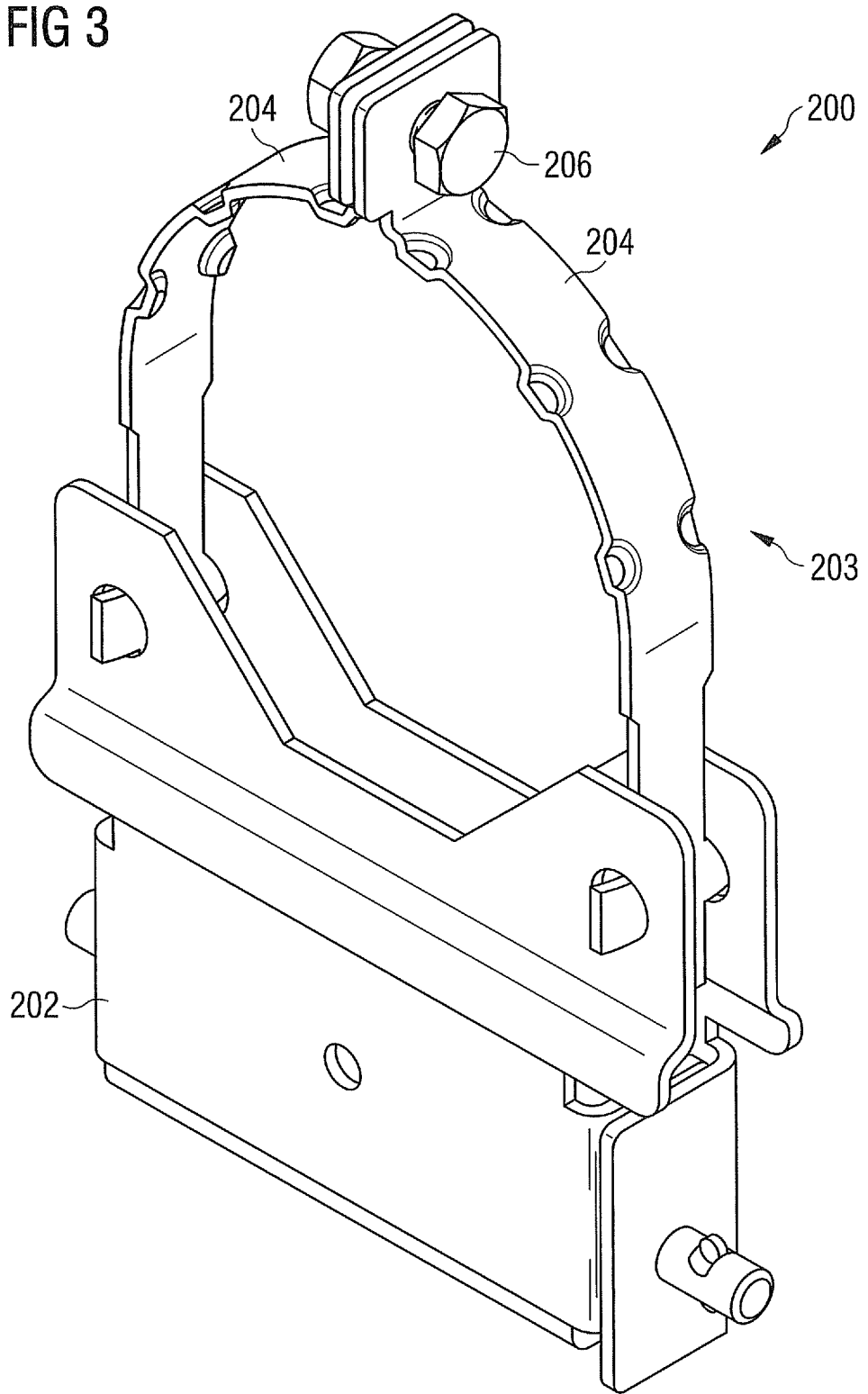

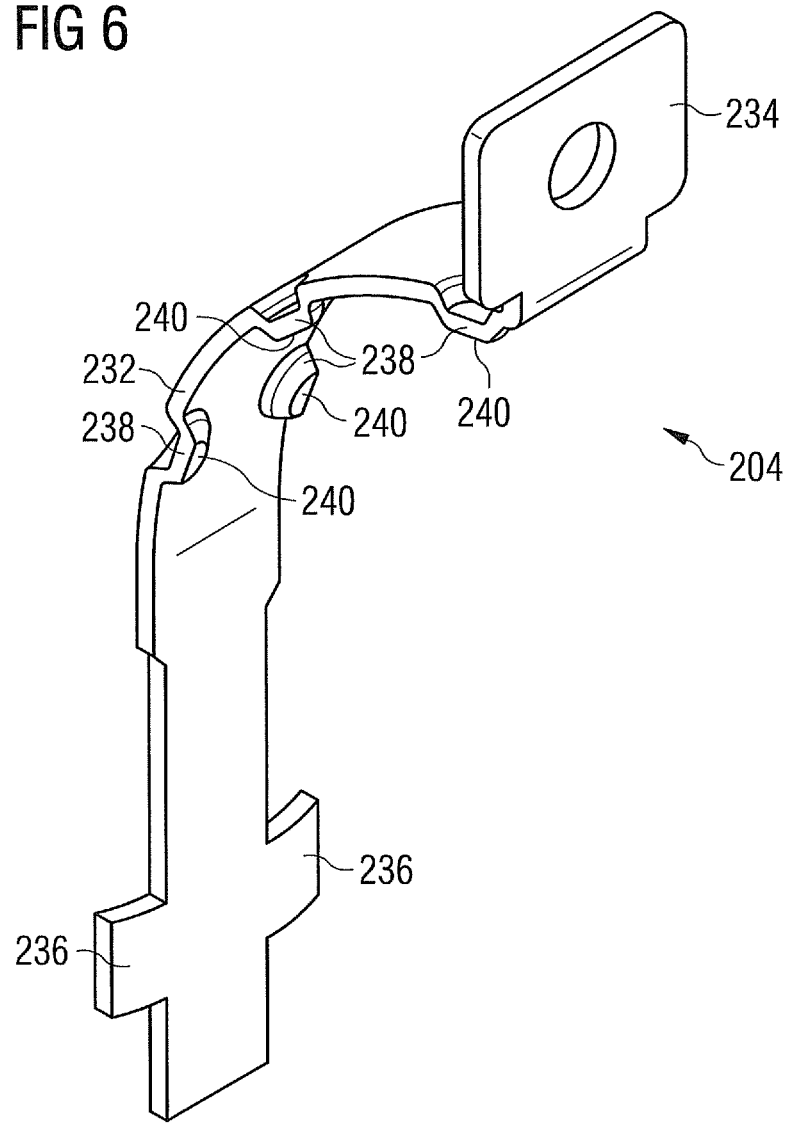

HEAT COLLECTION ELEMENT SUPPORT ELEMENT

CROSS REFERENCE TO RELATED APPLICATIONS

This application is the US National Stage of International Application No. PCT/EP2010/057988, filed Jun. 8, 2010 and claims the benefit thereof. The International Application claims the benefits of U.S. provisional application No. 61/185,089 filed Jun. 8, 2009. All of the applications are incorporated by reference herein in their entirety.

FIELD OF THE INVENTION

This invention relates to solar collection systems, and especially to support elements for use therewith.

BACKGROUND OF THE INVENTION

Amid concerns over global warming, and forecasts of both the depletion of non-renewable energy sources and rising power demand, suppliers of energy are increasingly seeking alternative primary sources of energy. One such source of energy is solar energy, and one way of utilizing solar energy is with a solar thermal power plant.

One type of solar power plant comprises a solar field which utilizes a "radiation concentrator collector" which concentrates the solar radiation by focusing it onto a smaller area, e.g., using mirrored surfaces or lenses. In this system, a reflector, which is typically parabolic, receives and reflects (focuses) incoming solar radiation onto a radiation absorber, which is formed as a tube. The tube radiation absorber is concentrically surrounded by a treated glass enclosure tube to limit the loss of heat. The collector system further includes means to track the sun.

The tube radiation absorber is made of metal with a coating having a high solar radiation absorption coefficient to maximize the energy transfer imparted by the solar radiation reflecting off the reflector. A heat transfer fluid (HTF), which is typically a liquid such as oil, flows within the tube radiation absorber.

The thermal energy is transported by the HTF to provide energy to, e.g., a thermal-electric power plant to drive one or more power-generation systems thereof, in order to generate electricity in a conventional way, e.g., by coupling the axle of each of the turbines to an electric generator. One such example of a thermal-electric power plant is a steam-electric power plant, which uses thermal energy provided thereto to produce steam to drive turbines thereof, which in turn drive a generator, thus generating electricity.

Throughout the solar field, the HTF flows within a tube, which is partially constituted by the tube radiation absorber. The entire length of the tube should be designed so as to limit thermal losses therefrom. Along much of its length, it is surrounded by a tube or pipe of a larger diameter, with the space therebetween being evacuated in order to limit heat loss due to convection.

SUMMARY OF THE INVENTION

According to one aspect of the present invention, there is provided a support element configured for supporting a heat collection element (HCE) of a solar concentrator in a solar thermal power plant, the support element comprising:
  a post engaging portion being configured for being pivotally articulated to the top of an HCE support post; and
  an HCE engaging portion being configured for retaining therein the HCE.

The HCE engaging portion may comprise a seat having sectors, edges of which are each configured to contact the HCE at a single point. The edges may be linear, i.e., formed as straight lines.

The seat may comprise at least three of the sectors disposed such that the HCE simultaneously contacts all three sectors simultaneously.

At least portions of the seat and the post engaging portion may be formed of a single piece of material.

The post engaging portion may comprise two half-sections, each of which may be formed of a single piece of bent sheet-metal.

Each of the half-sections may comprise at least two apertures, the half-sections being disposed such that when the post engaging portion is assembled, the apertures are arranged coaxially with one another. The support element may further comprise a rod configured to be received within the apertures, thereby securing the half-sections together. The rod may be further configured to attach the element to the top of the HCE support post.

The HCE engaging portion may comprise two clasps hinged articulated to the post engaging portion. Each of the clasps may comprise an arcuate portion formed with inwardly-directed dimples, bottom surfaces thereof lying along an arc of a radius which is substantially the same of that of the HCE. Each of the clasps may be formed of a single piece of bent sheet-metal.

According to another aspect of the present invention, there is provided a heat collection element (HCE) assembly for use in a solar thermal power plant, the HCE assembly comprising:
  a tubular HCE for carrying thermal fluid for heating by concentrated solar radiation therewithin;
  a plurality of HCE support posts configured for maintaining the HCE at a predetermined position; and
  a plurality of HCE support elements, configured for supporting the HCE on the HCE support posts; wherein each of the HCE support elements comprises:
  a post engaging portion being configured for being pivotally articulated to the top of one of the HCE support posts; and
  an HCE engaging portion being configured for retaining therein the HCE.

The HCE engaging portion may comprise a seat having sectors, edges of which are each configured to contact the HCE at a single point. The edges may be linear, i.e., formed as straight lines.

The seat may comprise at least three of the sectors disposed such that the HCE simultaneously contacts all three sectors simultaneously.

At least portions of the seat and the post engaging portion may be formed of a single piece of material.

The post engaging portion may comprise two half-sections, each of which may be formed of a single piece of bent sheet-metal.

Each of the half-sections may comprise at least two apertures, the half-sections being disposed such that when the post engaging portion is assembled, the apertures are arranged coaxially with one another. The support element may further comprise a rod configured to be received within the apertures, thereby securing the half-sections together. The rod may be further configured to attach the element to the top of the HCE support post.

The HCE engaging portion may comprise two clasps hinged articulated to the post engaging portion. Each of the clasps may comprise an arcuate portion formed with inwardly-directed dimples, bottom surfaces thereof lying along an arc of a radius which is substantially the same of that of the HCE. Each of the clasps may be formed of a single piece of bent sheet-metal.

The HCE support posts may be configured to pivot about a bottom end thereof, in a direction along which the HCE extends, with each support element being configured to pivot about a top end of its associated HCE support post in the same direction.

According to further aspects of the present invention, there are provided solar power plants comprising a support assembly and/or an HCE assembly as described above.

BRIEF DESCRIPTION OF THE DRAWINGS

In order to understand the invention and to see how it may be carried out in practice, an embodiment will now be described, by way of a non-limiting example only, with reference to the accompanying drawings, in which:

FIG. 1A is a perspective view of a typical solar concentrator as part of a solar thermal power plant;

FIG. 1B is a schematic side view of a heat collection element (HCE) assembly of the solar concentrator illustrated in FIG. 1A;

FIG. 3 is a perspective view of an example of an HCE support element according to the present invention;

FIG. 6 is a perspective view of a clasp of a HCE engaging portion of the HCE support element illustrated in FIG. 3.

DETAILED DESCRIPTION OF EMBODIMENTS

As illustrated in FIG. 1A, there is provided a solar concentrator, generally indicated at 100. The solar concentrator 100 is part of a solar thermal power plant (not illustrated) and comprises a reflecting surface 102, which may comprise a plurality of light concentration devices (LCDs) 104. The reflecting surface 102 may extend linearly and/or along a curved path dozens of meters, and has a parabolic cross-section. As such, a tracking mechanism (not illustrated) is provided in order to ensure that the reflecting surface 102 faces the sun, thereby concentrating solar radiation impinging thereupon toward it geometric focus. A heat collection element (HCE) 106 is provided along the focus of the parabola of the reflecting surface 102, thus receiving the concentrated solar radiation.

Figure 2:
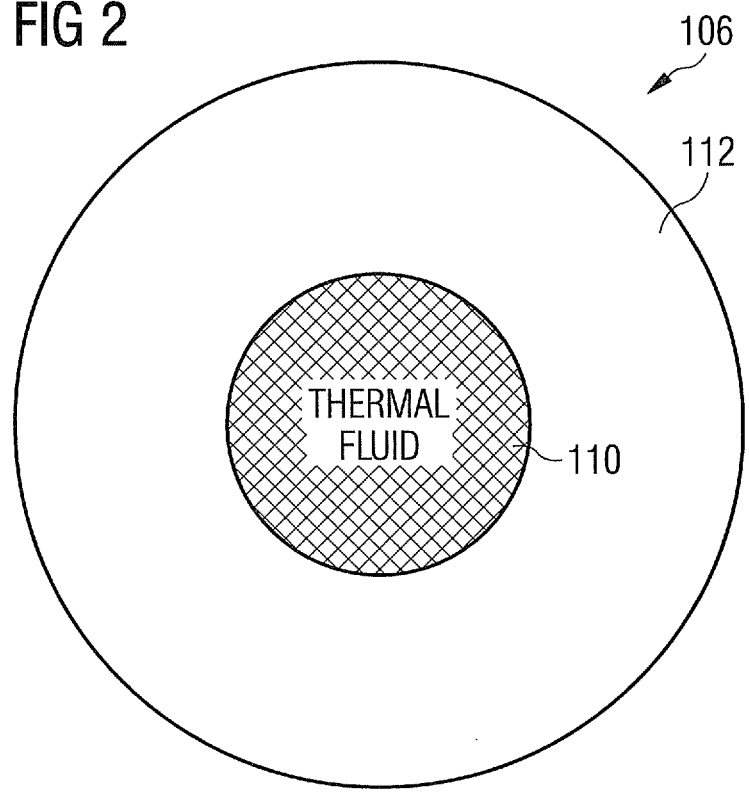
FIG. 2 is a cross-sectional view of the HCE, taken along line II-II in FIG. 1A.

As seen in FIG. 2, the HCE 106 comprises a tube radiation absorber (TRA) 110 through which a thermal fluid flows, surrounded by a glass tube 112 along its length. A thermal fluid, which is used to heat a working fluid in a separate loop to drive a power-generation cycle, flows within the TRA. The thermal fluid is heated by the concentrated solar radiation. The space between the TRA 110 and the glass tube 112 is evacuated in order to minimize heat loss due to cooling of the thermal fluid within the TRA by convection. Each end of the glass tube 112 may be enclosed by flexible external shield member (not illustrated).

HCE support posts 108 are provided, e.g., at regular intervals along the length of the HCE, to maintain the position of the HCE 106 at or near the focus of the parabola of the reflecting surface 102. They are designed to pivot about a bottom end 108a thereof, in the direction along which the HCE extends.

As more clearly illustrated in FIG. 1B, an HCE assembly 105 is provided, comprising the HCE 106, its associated HCE support posts 108, and support elements 200 configured for supporting the HCE on the HCE support posts. During use, the HCE 106 expands along its length in the direction of arrows A when it is heated. The HCE support posts are thus designed to pivot with the deflection of the HCE due to the thermal expansion.

As illustrated in FIG. 3, there is provided an HCE support element, generally indicated at 200. The support element 200 is configured for being pivotally (i.e., hingedly) attached to a top end 108b of an HCE support post 108, and to retain the HCE 106 therein. As such, it comprises a post engaging portion 202, which is configured for being hingedly articulated to the top end of an HCE support post 108, and an HCE engaging portion 203 configured for receiving and retaining the HCE 106 therewithin. A closure mechanism 206, such as a nut/bolt combination, is provided to secure the clasps together.

Figure 4:
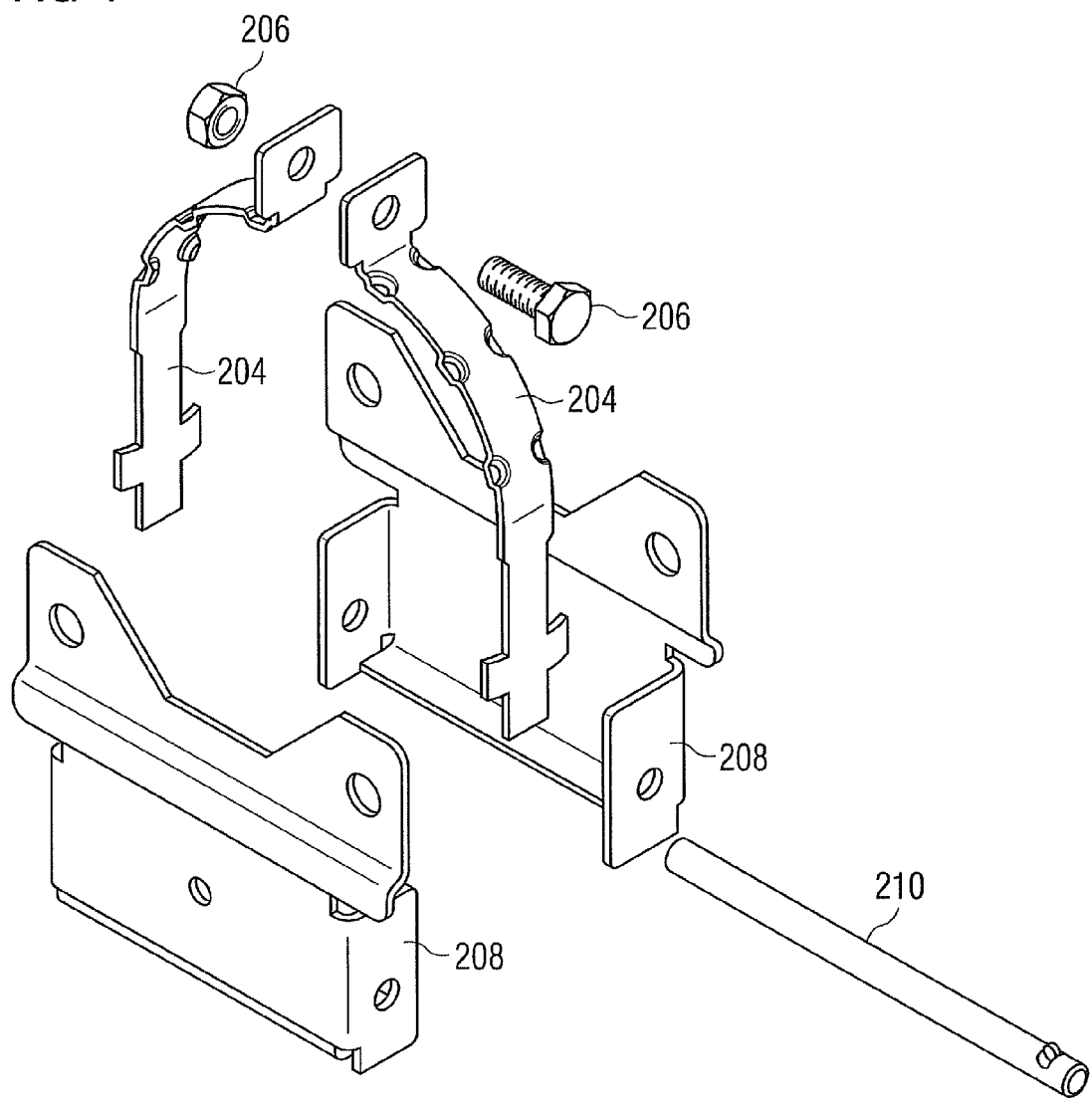
FIG. 4 is an exploded view of the HCE support element illustrated in FIG. 3.
Figure 5:
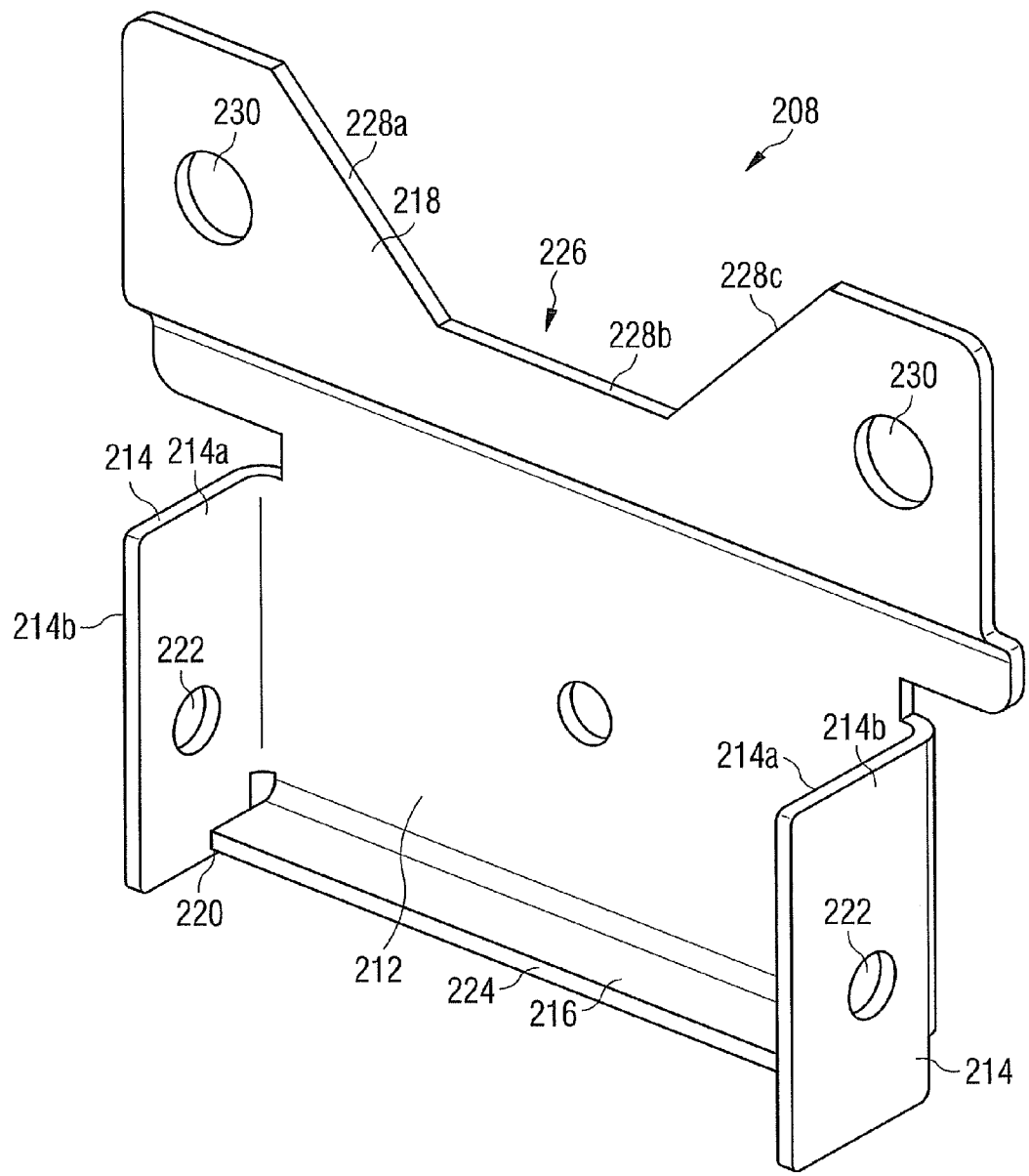
FIG. 5 is a perspective view of a half-section of a post engaging portion of the HCE support element illustrated in FIG. 3.

As best illustrated in FIG. 4, two half-sections 208 are provided, each comprising part of the post engaging portion 202. A rod 210 is further provided, whose use will be described below. As seen in FIG. 5, each half-section 208 comprises a base plate 212 having two assembly flaps 214, a stopper 216, and an HCE support portion 218 attached thereto. Each half-section 208 is constructed such that a gap 220, which is of a thickness to receive therein an assembly flap of the corresponding half-section 208, remains between the assembly flap 214 and the stopper 216. All of the elements which are attached to the base plate 212 may be formed integrally therewith, i.e., formed of the same piece of material. This allows each half-section 208 to be formed, e.g., from a single appropriately-shaped piece of sheet-metal, which facilitates simple manufacture thereof and assembly of the HCE support element 200.

The two assembly flaps 214 are disposed substantially perpendicularly to the base plate 212, and parallely to one another. Each comprises a through-going aperture 222 which is aligned coaxially with the corresponding through-going aperture on the opposite assembly flap and of a diameter to receive therethrough the rod 210. The two half-section 208 may be formed such that the assembly flaps on each half-section are the same distance from each other, or such that the distance between inwardly facing surfaces 214a of the assembly flaps of one of the half-sections 208 is the same or slightly larger than the distance between outwardly facing surfaces 214b of the other half-section. The significance of this will become clear below. In addition, the assembly flaps 214 extend beyond an outwardly-facing edge 224 of the stopper 216, for example about twice as far from the base plate 212.

The half-sections 208 each comprise portions of an upwardly-facing seat 226, which constitutes part of the HCE engaging portion 203. The seat comprises three linear (i.e., straight) edges 228a, 228b, 228c (hereafter indicated collectively as 228) and two through-going apertures 230 on opposite sides thereof. The edges 228 are disposed such that the HCE with which the HCE support element 200 is configured for use contacts all three edges simultaneously, i.e., the edges are disposed such that each of the edges is simultaneously tangent to a circle of the diameter of the HCE. This construction limits the physical contact area between the HCE support element 200 and the HCE, thereby reducing the amount of heat loss via the HCE support element through conduction (i.e., contact between the HCE with the seat 226).

As best seen in FIG. 6, each of said clasps 204 is formed comprising an arcuate portion 232, an upturned flange 234 at one end thereof, and two wings 236 extending laterally upwardly (i.e., in a direction toward the arcuate portion) at the opposite end thereof.

The arcuate portion 232 is formed with inwardly-directed dimples 238, which are formed such that the bottom surfaces 240 thereof lie along an arc which is substantially of the same radius as the HCE. In this way, when the clasps 204 grip the HCE therein, only the bottom surfaces 240 of the dimples 238 contact the HCE directly, which further lowers the contact area between the HCE support element 200 and the HCE and further reducing the amount of heat loss via the HCE support element through conduction.

The flange 234 is formed with a through-going aperture 242 which is configured for receiving therein the closure mechanism 206.

Each of the wings 236 is of a height which allows it to be received with one of the through-going apertures 230 of the HCE support portion 218, while allowing rotation thereof therewithin.

It will be appreciated the each clasp 204 may be formed, e.g., from a single appropriately-shaped piece of sheet-metal, which facilitates simple manufacture thereof and assembly of the HCE support element 200.

In use, the two half-sections 208 are brought together such that the outwardly-facing edges 224 of the stoppers 216 face one another. If the half-sections 208 are constructed such the assembly flaps 214 on each half-section are the same distance from each other, then the assembly flap of a first of the half-sections is received within the corresponding gap 220 of the second, and the assembly flap of the second of the half-sections is received within the corresponding gap of the first. If the half-sections 208 are constructed such that the distance between inwardly facing surfaces 214a of the assembly flaps of the first of the half-sections is the same or slightly larger than the distance between outwardly facing surfaces 214b of the second half-section, then each assembly flap 214 of the second half-section is received within the corresponding gap 220 of the first.

Concurrently, the wings 236 of the clasps 204 are received within the apertures 230 of the HCE support portion 218. As the wings 236 extend upwardly, they project away from the half-sections 208, thus helping to join (i.e., lock) them together. In addition, the loose connection between the clasps 204 via the wings 236 and the post engaging portion 202 lowers the contact area between the HCE support post and the HCE, which further reduces the amount of heat loss via the HCE support element through conduction. The rod 210 is inserted through the through-going apertures 222 of the post engaging portion 202. If the HCE support post 108 is appropriately constructed, i.e., comprising through-going apertures at the top thereof, the HCE support element 200 may be placed such the through-going apertures 222 of the post engaging portion 202 are aligned coaxially with the apertures of the HCE support post, and the rod 210 inserted through them as well.

With the insertion of the rod 210, the HCE support element 200 is secured together in a simple fashion, which may be accomplished by a single user without the need for special tools.

Subsequently, the HCE is placed on the upwardly-facing seat 226, the claps 204 are closed around the HCE, and the closure mechanism 206 is engaged to lock the claps 204 in a closed position around the HCE, thus securing it within the HCE support element 200.

Figure 7:
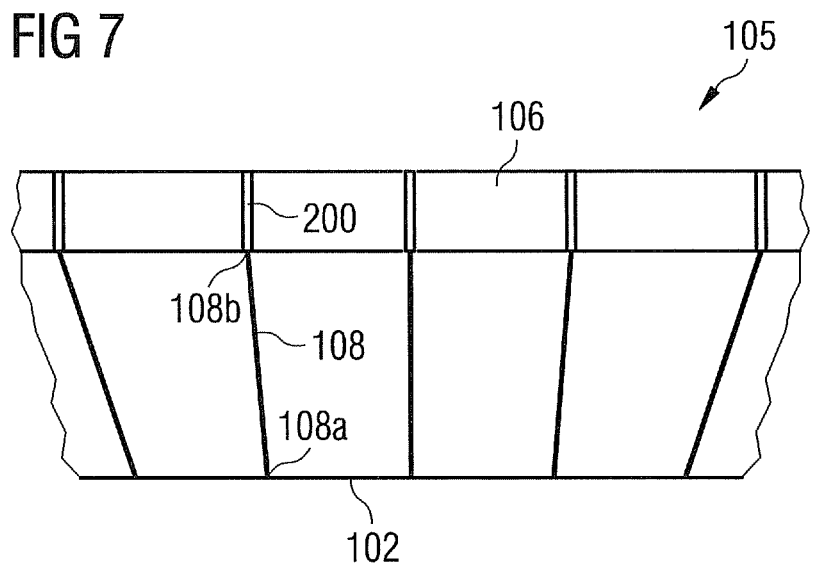
FIG. 7 is a schematic side view of the heat collection element (HCE) assembly of the solar concentrator illustrated in FIG. 1A, illustrated undergoing thermal expansion during use.

The HCE support element 200 is attached to the top end 108b of a corresponding HCE support post 108 via the rod. This facilitates free pivoting of the HCE support element 200 as the HCE support posts 108 pivot with expansion of the HCE 106 due to the increased temperature thereof. This arrangement allows the HCE to expand without exerting undue stress thereupon or on any of the elements supporting it (i.e., the HCE support element, HCE support post, etc.), as illustrated in FIG. 7.

Those skilled in the art to which this invention pertains will readily appreciate that numerous changes, variations and modifications can be made without departing from the scope of the invention mutatis mutandis.

The invention claimed is:

1. A solar concentrator, comprising:
a reflecting surface with a parabolic cross section;
a heat collection element (HCE) assembly for use in a solar thermal power plant, the HCE assembly comprising:
a glass tubular HCE for carrying thermal fluid for heating by concentrated solar radiation there within;
a plurality of HCE support posts configured for maintaining the HCE at a predetermined position; and
a plurality of HCE support elements, configured for supporting the HCE on the HCE support posts; wherein each of the HCE support elements comprises:
a post engaging portion being configured for being pivotally articulated to the top of one of the HCE support posts; and
an HCE engaging portion being configured for retaining therein the glass tubular HCE, wherein the HCE engaging portion comprises a seat having sectors, edges of which are each configured to contact the glass tubular HCE at a single point wherein the seat comprises at least three of the sectors disposed such that the HCE simultaneously contacts all three sectors simultaneously, and wherein at least portions of the seat and the post engaging portion are formed of a single piece of material.
the HCE assembly arranged along the focus of the reflecting surface.

2. The solar concentrator according to claim 1, wherein the HCE engaging portion comprising two clasps hinged articulated to the post engaging portion.

3. The solar concentrator according to claim 2, wherein each of the clasps comprises an arcuate portion formed with inwardly-directed dimples, bottom surfaces thereof lying along an arc of a radius which is substantially the same of that of the glass tubular HCE.

4. The solar concentrator according to claim 1, wherein the post engaging portion effective to automatically pivot due to a thermal expansion of the glass tubular HCE.

* * * * *